United States Patent
Brentrup et al.

(10) Patent No.: US 12,494,305 B2
(45) Date of Patent: Dec. 9, 2025

(54) METHOD OF MANUFACTURING AN ELECTRIC CABLE CONNECTION ASSEMBLY AND CABLE CONNECTION ASSEMBLY

(71) Applicant: HIK GmbH, Oberzent (DE)

(72) Inventors: Berthold Brentrup, Neckargemünd (DE); Sebastian Kaltenbach, Wald-Michelbach (DE)

(73) Assignee: HIK GmbH, Oberzent (DE)

( * ) Notice: Subject to any disclaimer, the term of this patent is extended or adjusted under 35 U.S.C. 154(b) by 139 days.

(21) Appl. No.: 18/363,861

(22) Filed: Aug. 2, 2023

(65) Prior Publication Data

US 2024/0339250 A1 Oct. 10, 2024

(30) Foreign Application Priority Data

Apr. 6, 2023 (DE) ...................... 10 2023 108 857.2

(51) Int. Cl.
*H01B 13/06* (2006.01)
*H01B 13/012* (2006.01)
*H01R 4/70* (2006.01)

(52) U.S. Cl.
CPC ........... *H01B 13/06* (2013.01); *H01B 13/012* (2013.01); *H01R 4/70* (2013.01)

(58) Field of Classification Search
None
See application file for complete search history.

(56) References Cited

U.S. PATENT DOCUMENTS

| | | | | |
|---|---|---|---|---|
| 4,561,155 A | * | 12/1985 | Randar | H01R 43/01 29/710 |
| 4,570,032 A | * | 2/1986 | Charlebois | H02G 15/117 174/92 |

(Continued)

FOREIGN PATENT DOCUMENTS

| | | |
|---|---|---|
| CA | 2768374 C | 2/2015 |
| CN | 2322284 Y | 6/1999 |

(Continued)

OTHER PUBLICATIONS

First Office Action for corresponding German Application No. 10 2023 108 857.2 dated Feb. 1, 2024 and its English Machine Translation.

(Continued)

*Primary Examiner* — Krystal Robinson
(74) *Attorney, Agent, or Firm* — Renner, Otto, Boisselle & Sklar, LLP

(57) ABSTRACT

In a process for manufacturing an electric cable connection assembly 1 for connecting solar panels, a circumferential surface layer 6 of the respective cable sheath is partially removed by exposure to light at end portions of at least two individual cables which are connected to a respective exposed conductor end portion 5. After forming an electrically conductive connection between the cables 2, the cables 2 are introduced into the cavity 18 of an injection molding tool 15 and a heated, plastically deformable plastic granulate consisting of the same material as the cable sheath is injected into the cavity 18. The plastic material crosslinks homogeneously. An insulating sheath formed in this way is characterized by improved moisture protection and mechanical resistance.

16 Claims, 11 Drawing Sheets

(56) References Cited

U.S. PATENT DOCUMENTS

| | | | |
|---|---|---|---|
| 4,581,480 A * | 4/1986 | Charlebois | H02G 15/117 |
| | | | 174/92 |
| 8,519,278 B2 | 8/2013 | Lenel | |
| 8,604,342 B2 | 12/2013 | Solon | |
| 8,917,052 B2 | 12/2014 | Zhang et al. | |
| 8,937,249 B2 | 1/2015 | Solon | |
| 10,192,706 B2 | 1/2019 | Solon et al. | |
| 10,425,035 B2 | 9/2019 | Corneille et al. | |
| 10,553,739 B1 | 2/2020 | Solon | |
| 10,992,254 B2 | 4/2021 | Solon | |
| 11,387,594 B2 | 7/2022 | Drmota Petric et al. | |
| 2009/0140832 A1 * | 6/2009 | Frohlke | H01H 85/201 |
| | | | 337/187 |
| 2013/0081871 A1 * | 4/2013 | Dewitte | B29C 44/569 |
| | | | 252/502 |
| 2020/0343795 A1 * | 10/2020 | Stöck | H02K 15/04 |

FOREIGN PATENT DOCUMENTS

| | | | | |
|---|---|---|---|---|
| DE | 3533375 A1 * | 3/1987 | | H02G 15/10 |
| DE | 4414258 A1 | 10/1995 | | |
| DE | 19717627 A1 | 10/1998 | | |
| DE | 202004000526 U1 * | 4/2004 | | H01H 85/201 |
| DE | 202006006170 U1 | 9/2006 | | |
| DE | 102005016266 A1 | 10/2006 | | |
| DE | 202008016324 U1 | 4/2009 | | |
| DE | 102011008887 A1 | 9/2011 | | |
| DE | 102017125887 A1 | 5/2019 | | |
| DE | 102017011862 A1 | 6/2019 | | |
| DE | 102018111712 A1 | 11/2019 | | |
| DE | 102019102156 A1 | 7/2020 | | |
| EP | 0723324 A2 | 7/1996 | | |
| EP | 1277263 B1 | 6/2006 | | |
| EP | 1556935 B1 | 12/2006 | | |
| EP | 1867010 B1 | 8/2010 | | |
| EP | 2277680 A1 | 1/2011 | | |
| EP | 1879258 B1 | 8/2011 | | |
| EP | 3453080 B1 | 7/2021 | | |
| JP | S52120387 A | 10/1977 | | |
| WO | 2020157134 A1 | 8/2020 | | |

OTHER PUBLICATIONS

IDS-55 Helios Overmolded Solar Junctions—Amphenol.

* cited by examiner

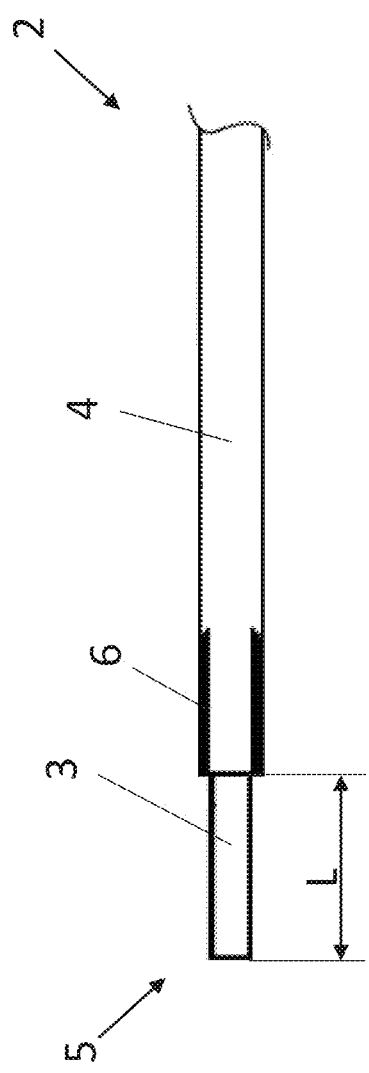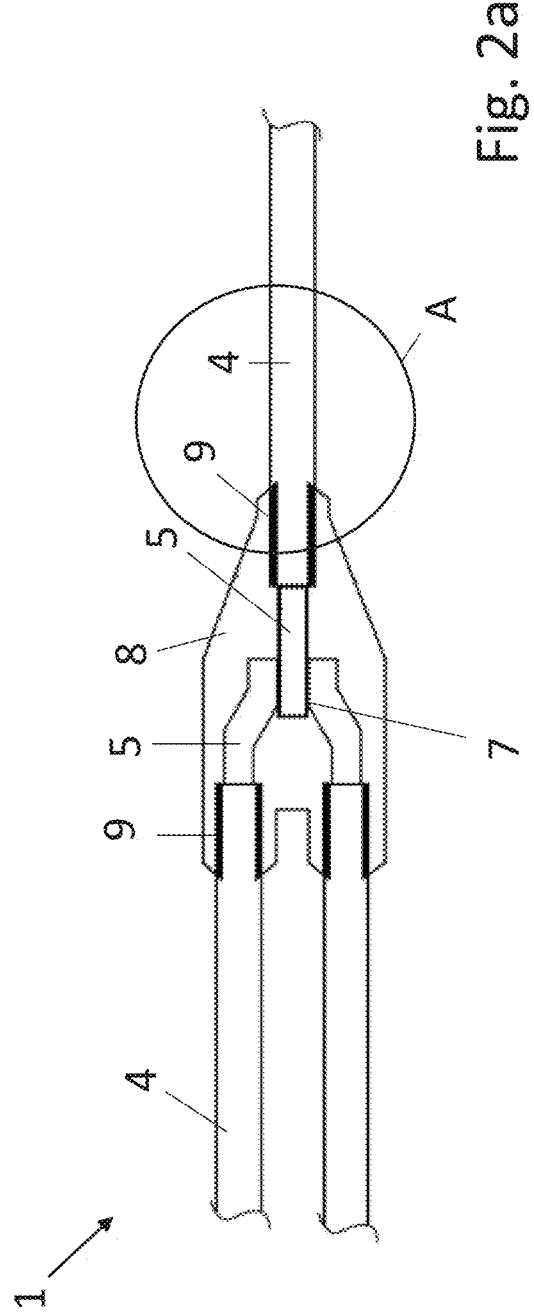

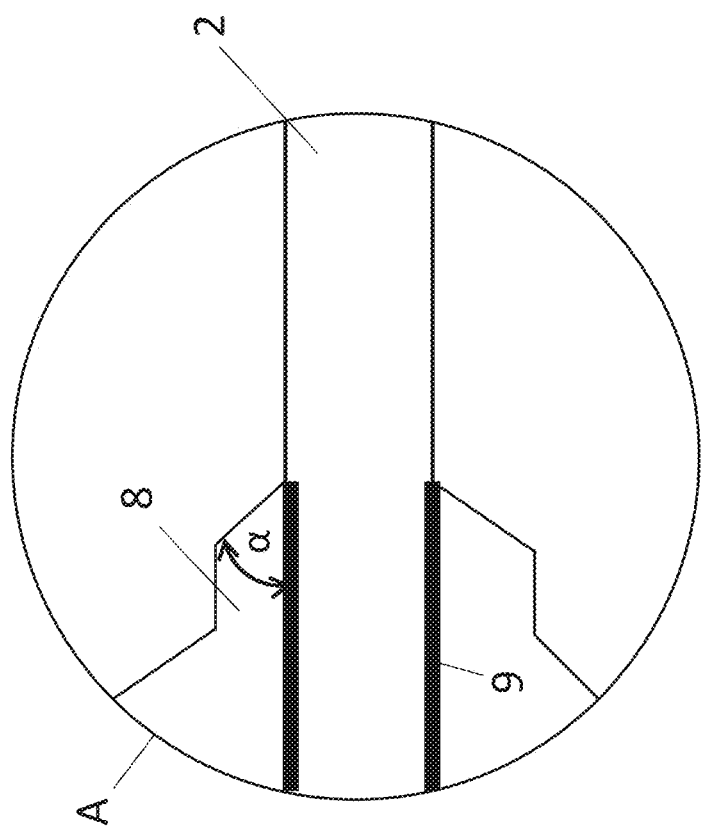

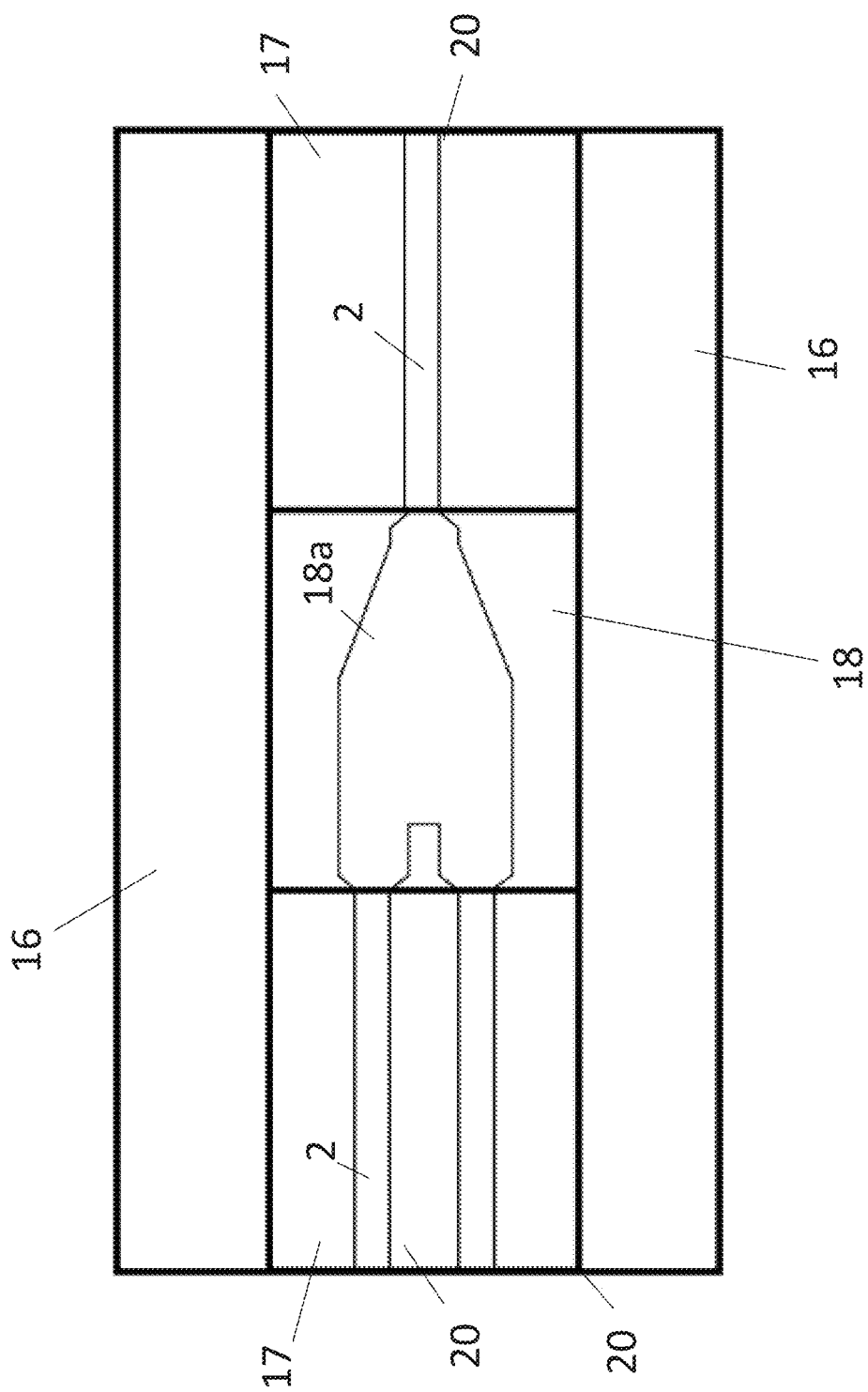

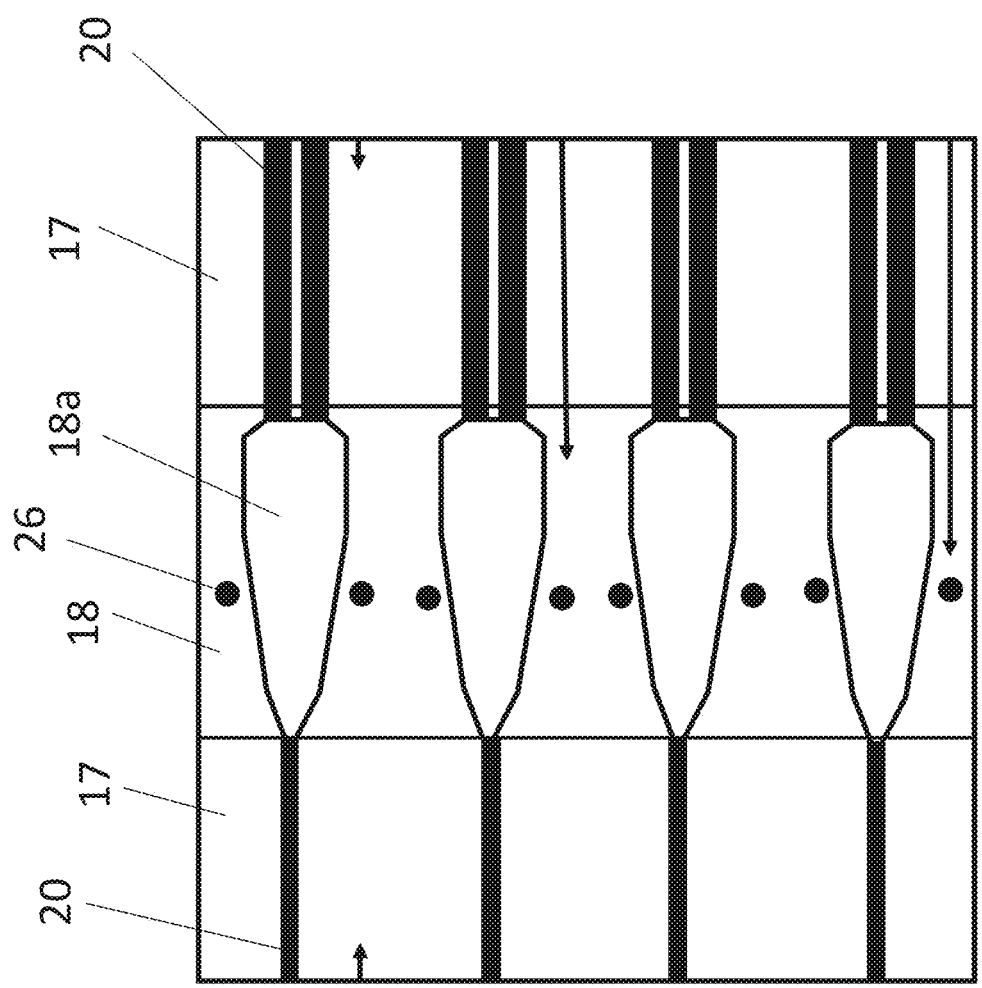

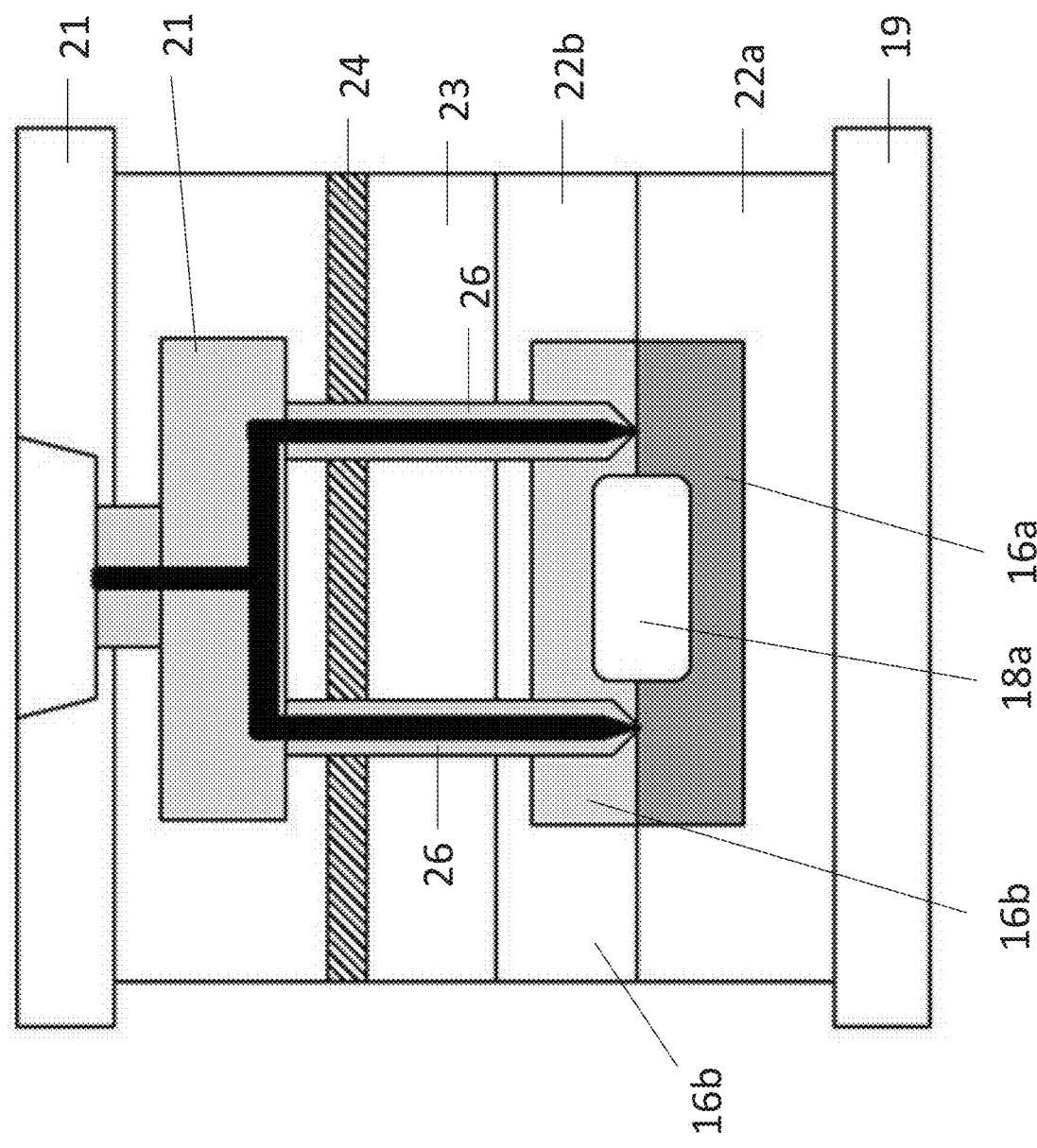

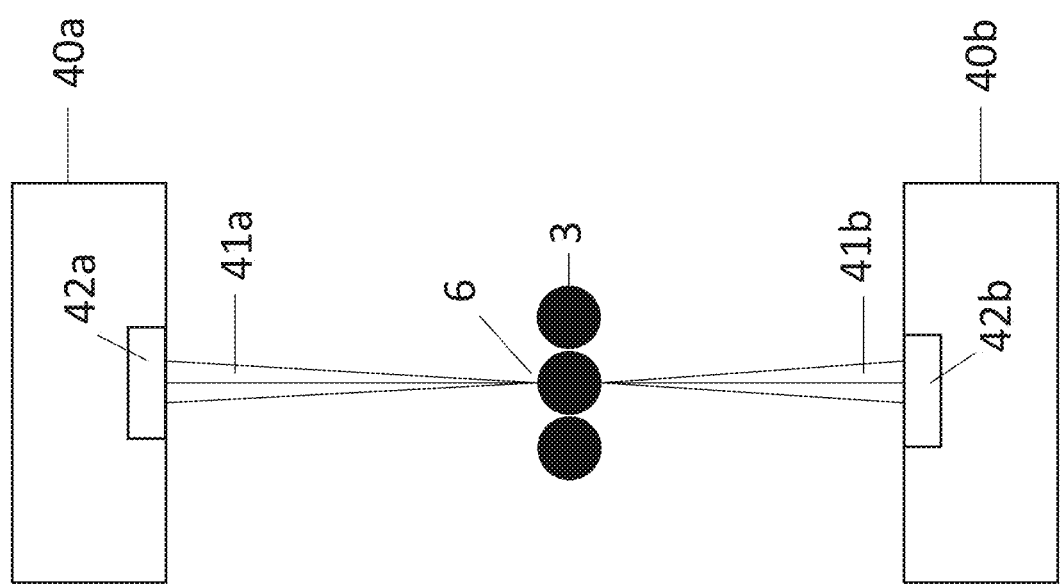

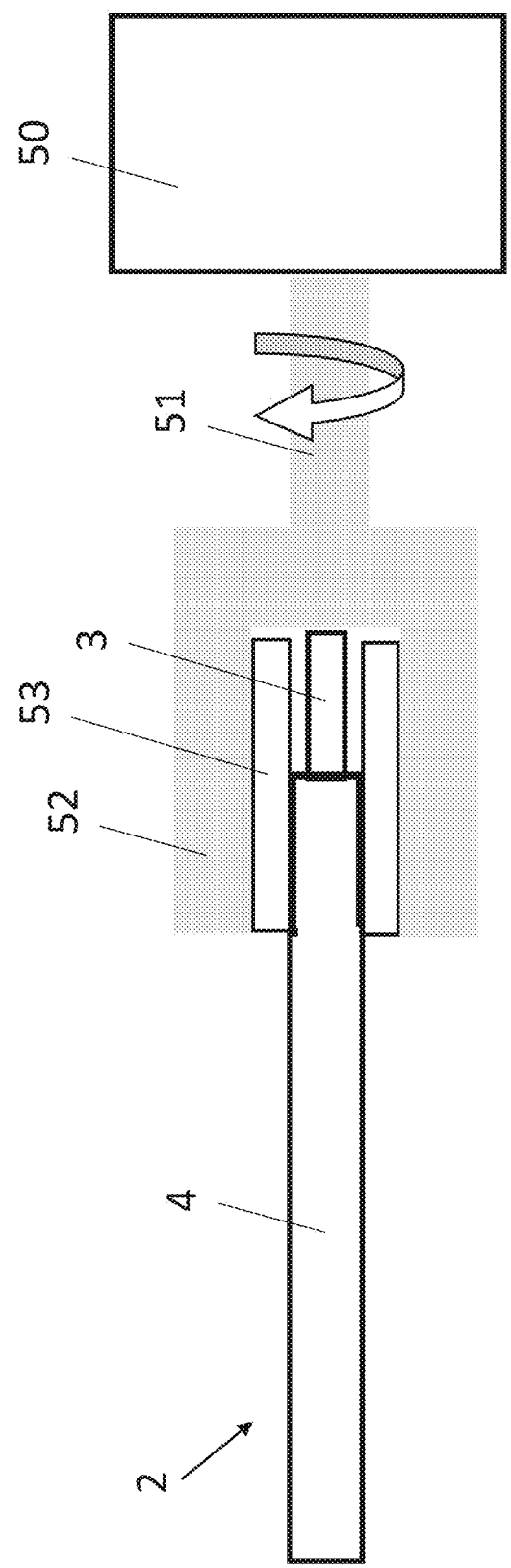

METHOD OF MANUFACTURING AN ELECTRIC CABLE CONNECTION ASSEMBLY AND CABLE CONNECTION ASSEMBLY

The present application claims priority of German patent application no. DE 10 2023 108 857.2 'Method of manufacturing an electric cable connection assembly and cable connection assembly' filed on Apr. 6, 2023, the whole contents of which are hereby incorporated by reference.

FIELD OF INVENTION

The present invention relates to a method of manufacturing an electric cable connection assembly for connecting solar panels, and to a cable connection assembly manufactured thereby.

BACKGROUND OF INVENTION

In the installation of some conventional photovoltaic modules, the attachment of electrical connectors to the photovoltaic module also requires potting or adhesives to achieve secure and reliable electric connections. Some typical connections between an electrical connector and a photovoltaic module may require multiple process steps after the photovoltaic module is manufactured, increasing time, materials and costs, and increasing the risk of errors or problems. For example, electrical components may need to be soldered together, posing a potential risk of solder joint failure and additional time and materials. Some traditional junction boxes may also need to be potted and primed, which also presents potential failure points and requires additional time and materials. In addition, installing a photovoltaic module may become more difficult and time-consuming if a module connector is crimped to the module before the module is installed in a location.

For the installation of solar panels, for example on roofs, cable connection assemblies have proven themselves for the formation of suitably interconnected strings, which are designed in particular as cable branches in standard configurations. Such cable connection assemblies may be designed, for example, as double, triple or multiple cable branches to enable the most time-saving, simple and safe installation possible. Additional components, for example diodes or reverse current fuses, can be incorporated in such cable connection assemblies.

In addition to the actual purpose of establishing branches, such branching points often have to fulfill further requirements with regard to, for example, electromagnetic shielding, moisture protection, locking, mechanical resistance and so on. In addition to insulation materials such as heat-shrinkable tubing, also casting compounds and epoxy resin coatings, enclosures or housings can be used.

However, when using casting compounds or epoxy resin coatings, imperfections such as delaminations and leaks are repeatedly observed after several years of use. This weakens the cable connection assemblies and can result in creepage currents or even internal corrosion.

German patent application DE 10 2019 102 156 A1 discloses a T-branch piece for the electrically conductive connection of two conductors to a third conductor, wherein the branch is accommodated within an internal connection and the internal connection is encapsulated by the enclosing material in such a way that the shielding effect of the shielding braids of the conductors is extended to the branch.

German patent DE 10 2011 008 887 B4 discloses an electrical connection element in the form of a Y-shaped distributor.

Another solar connector is disclosed in German patent DE 10 2005 016 266 B4.

SUMMARY OF THE INVENTION

It is an object of the present invention to provide an improved method, in particular a process-safe method, whereby an electric cable connection assembly for connecting solar panels can be manufactured in a cost-efficient and simple manner. It is a further object of the present invention to provide such an electric cable connection assembly which offers improved moisture protection, improved insulation resistance and mechanical resistance. Another aspect of the present invention relates to a suitably manufactured cable connection assembly for connecting solar panels with each other.

The present invention is based on the finding that the material of the cable sheath can immediately and completely crosslink with new plastic material supplied during an injection molding operation for forming an insulating sheath of an electric connection portion in a heated, plastically deformable state, after being generated by heating from a plastic granule, when a circumferential surface layer of the respective cable sheath adjacent to a respective exposed conductor end portion is previously subjected to some kind of surface processing By processing the surface of the cable sheath, portions of the material of the cable sheath close to the surface, which have been oxidized over the period after the manufacture of the electric conductor or which have been transformed in some other way, can be reconditioned or processed in a suitable manner. This surface treatment can basically be carried out in such a way that relatively thin surface areas of the cable sheath are removed circumferentially or are at least roughened in order to provide fresh surface areas as a basis for improved crosslinking.

An insulating sheath formed in this way is characterized in particular by improved moisture protection, improved insulation resistance and improved mechanical resistance. Furthermore, according to the present invention, a permanent and inseparable connection between the cable sheath and the potting can be achieved.

For processing the surface of the cable sheath, the portions of the material of the cable sheath close to the surface can be removed up to a suitable depth, in particular by exposure to light, for example by means of laser light. In principle, however, also a mechanical processing of portions of the material of the cable sheath close to the surface can be used for this purpose, for example mechanical ablation of the portions close to the surface of the material of the cable sheath by scraping, rubbing or milling. Preferably, the portions of the material of the cable sheath close to the surface that are processed extend around the entire circumference of the cable sheath.

OVERVIEW ON DRAWINGS

In the following, the invention will be described in an exemplary manner and with reference to the accompanying drawings, from which further features and advantageous effects may become apparent to a person skilled in the art. In the drawings:

FIG. 1 is a schematic diagram of an electric cable for manufacturing a cable connection assembly according to the present invention:

FIG. 2a is a schematic diagram of a cable connection assembly according to the present invention:

FIG. 2b is a magnified view of detail A in FIG. 2a:

FIG. 4a shows an intermediate step in a method of manufacturing a cable connection assembly according to the present invention;

FIG. 4c shows another example of an intermediate step in a method of manufacturing a cable connection assembly according to the present invention:

FIG. 5 is a schematic cross-sectional view of an injection mold for manufacturing a cable connection assembly according to the present invention:

FIG. 8 is schematic view of a device for forming surface-processed cable sheath end portions using laser light; and FIG. 9 is a schematic diagram of a mechanical device for forming surface-processed cable sheath end portions.

In the drawings, identical reference numerals denote identical or substantially equivalent elements or groups of elements.

DETAILED DESCRIPTION OF PREFERRED EMBODIMENTS

Figure 3:
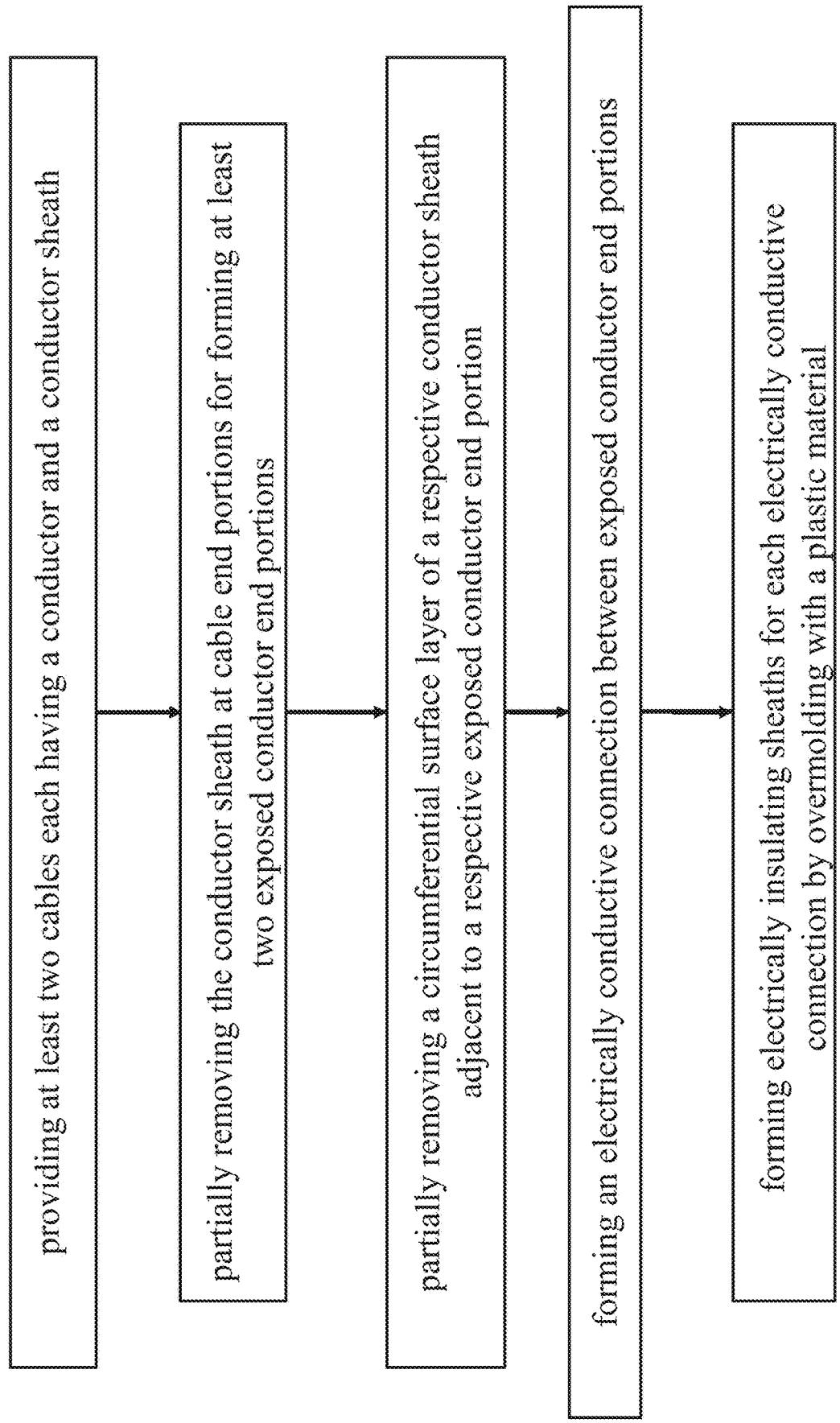
FIG. 3 is a block diagram of an exemplary method of manufacturing a cable connection assembly according to the present invention.

As shown in FIG. 1, a cable 2 for manufacturing a cable connection assembly according to the present invention comprises an electric conductor 3 which is sheathed in the known manner by an insulating cable sheath 4. The electric conductor 3 is formed in particular as a stranded wire, consisting of a plurality of thin individual wires, in particular of copper or aluminum, and is therefore an electric conductor which is easy to bend. For example, an ethylene-propylene copolymer or an ethyl vinyl acetate (EVA) can be used as the material of the cable sheath. A prerequisite is, in particular, that the cable is approved according to EN 50618 or IEC62930 or standard EN 50618.

To form a cable connection assembly according to the present invention, the electric conductor 3 is first exposed over a predetermined length L at one end of a respective electric cable 2, for example using a stripping tool or an automatic stripping machine, in order to form a respective exposed conductor end portion 5. In doing so, damage to the electric conductor 3 by indentations or the like should be avoided.

Subsequently, adjacent to the exposed conductor end portion 5 and over a length that is essentially matched to the length of the insulating sheath 8 to be formed subsequently (cf. FIG. 2a), a surface layer of the cable 2 is processed and ablated, in particular by means of exposure to light. In this process, the surface layer of the cable 2 is processed and ablated as uniformly as possible in the region 6, which includes in particular an ablation of the material of the cable sheath 4 near its surface over the entire circumference of the cable sheath 4 that is as uniform as possible. In this way, adjacent to the exposed conductor end portion 5 and over a length that is essentially matched to the length of the insulating sheath 8 to be subsequently formed (cf. FIG. 2a), a circumferential surface layer 6 is formed in which the material of the cable sheath 4 has been processed in order to pretreat this portion for subsequent crosslinking with freshly supplied plastic material for forming an insulating sheath 8 according to the present invention.

As a result of the surface treatment or surface processing, as set out in more detail below, a surface layer of the cable sheath 4 in the region designated in the drawings by reference numeral 6 can be suitably heated or briefly melted, in particular along the entire circumference and near the surface of the cable sheath 4. The removal of a relatively thin surface layer in the region designated by reference numeral 6 by exposure to light has also been found to be suitable, so that the circumferential surface layer 6 may have a slightly smaller outer diameter than the rest of the cable sheath 4. The formation of line or hatch patterns, even several times in the same plane or in mutually offset planes, in the region designated by reference numeral 6 has also been found to be suitable. By exposure to light, the circumferential surface layer 6 can also simply be polished and smoothed in order to predefine characteristics of the circumferential surface layer 6 that are as homogeneous as possible.

Exposure to light may result in a local heating of the material of the cable sheath 4 in the region designated by reference numeral 6, in particular a heating of portions of the material of the cable sheath 4 near the surface. It has been shown that, according to the present invention, portions of the material of the cable sheath 4 near the surface, which have been oxidized over the period after the manufacture of the electric conductor 2 or have been transformed in some other way, for example by outgassing or vaporization of highly volatile constituents of the material of the cable sheath 4, can thereby be suitably reconditioned or processed again. In particular, exposure to light may cause layers close to the surface of the material of the cable sheath 4 in the region designated by reference numeral 6 to be removed or roughened in such a way that the material of the cable sheath 4 crosslinks directly and completely with new, similar (or identical) plastic material to form an insulating sheath 8.

In the region designated by reference numeral 6, overall a surface-processed cable sheath end portion 9 is thus formed.

Alternatively, also other processes for processing the surface of the cable sheath 4 may be used to remove a relatively thin surface layer in the region designated by reference numeral 6. In particular, mechanical processes for surface treatment or surface processing may be used, as set forth hereinafter by way of example with reference to FIG. 9.

In the embodiment shown in FIG. 2a, in which a T-branch piece is shown as an example for a cable connection assembly, a total of three electric conductors 2 are suitably arranged with their respective exposed conductor end portions 5 so that the three exposed conductor end portions 5 are disposed directly adjacent to each other in a Y-configuration. The electric conductors 3 are then interconnected, for example by semi-automatic welding of pre-tinned strands or resistance welding or crimping at the three exposed conductor end portions 5, to form an electrically conductive connection portion 7.

The aforementioned surface processing in the regions designated by reference numeral 6 may alternatively also be carried out after the step of connecting the at least two cables 2 with each other to form electrically conductive connection portions 7.

Subsequently, an electrically conductive connection portion 7 formed in this way is inserted into the cavity of an injection mold, the cavity specifying the shape of the insulating sheath 8 to be formed.

Hot plastic material in liquid or molten form is then introduced into the cavity under high pressure, resulting in complete and perfect crosslinking of the material of the surface-processed cable sheath end portions 9 with the hot plastic material, forming an insulating sheath 8 completely encapsulating the electrically conductive connection portion 7. After opening the cavity, the cable connection assembly 1 formed in this way with the at least one electrically conductive connection portion 7 and the insulating sheath 8 encapsulating the latter can be removed.

As shown in FIG. 2b, end portions of the respective insulating sheath 8 extend towards the associated cable sheath 8 at an acute angle, the acute angle preferably being in the range between 10 and 45 degrees. Right-angled (90 degrees) edges are to be avoided. In this way, volume shrinkage of the plastic material during cooling in the hollow mold of the injection mold or even outside it can be accommodated without causing undesirable tearing off of plastic material in the transition region, which further prevents the occurrence of leaks.

FIG. 4a shows in a schematic plan view an intermediate step in a method of manufacturing a cable connection assembly according to the present invention. Not shown are further mold inserts for the precise shaping of the insulating sheath 8. The cavity 18 is formed in an insert plate of a molding tool and is delimited by longitudinally extending lateral elevations and two lateral boundary plates 17 arranged therebetween, in which feedthroughs 20 for the cables 2 are suitably formed. Inserted in the cavity 18 is a hollow mold 18a, which will define the actual shape of the insulating sheath 8, with an internal volume which will define, for example, a total weight of plastic mass of about 11 g for the insulating sheath 8. A typical length of the hollow mold 18a may be in the range of about 40 to 200 mm.

As shown in FIG. 4a, feedthroughs 20 for the cables 2 extend through the lateral boundary plates 17, through which the cables 2 can be introduced into the cavity 18 and into the hollow mold 18a in such a way that the very high pressures of >1000 bar required to form the insulating sheath 8 during the actual injection of the hot plastic compound into the hollow mold 18a do not result in an uncontrolled escape of the hot plastic compound from the hollow mold 18a, but instead the hot plastic compound remains enclosed the hollow mold 18a. The specific number and shape as well as the specific course of the feedthroughs 20 is adapted to the geometry of the particular cable connection assembly to be manufactured.

Figure 4B:
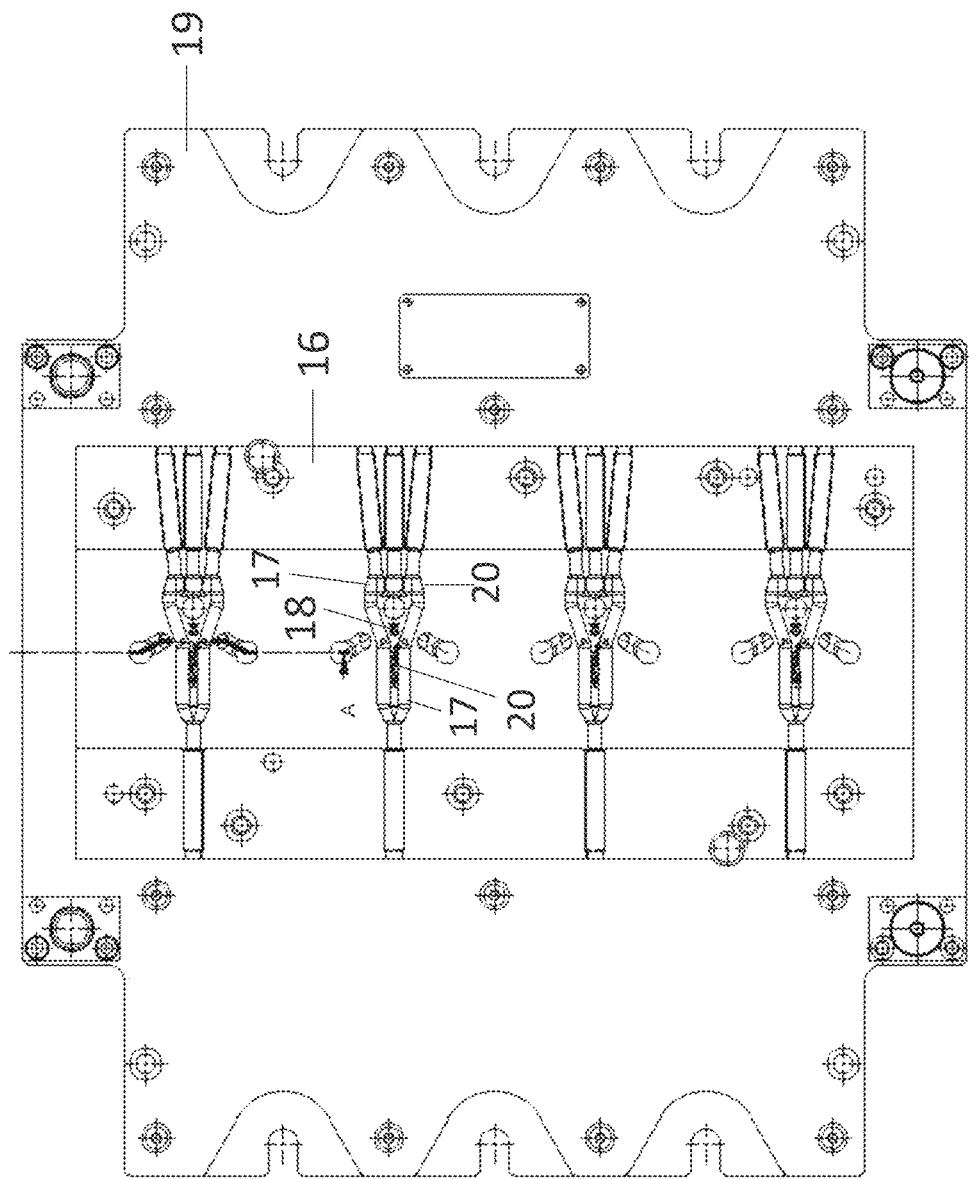
FIG. 4b is a plan view showing a portion of an injection mold for manufacturing a cable connection assembly according to the present invention.

As shown in FIG. 4b, several such cavities may be arranged in a suitable manner on a clamping plate 19 of an injection mold.

As shown in FIG. 4c, channels 26 open into the hollow molds 18a so that a hot plastic compound can be injected into the hollow molds 18a via the channels 26, as set forth below.

Referring to FIG. 5, the hollow mold 18a is formed between two insert plates 16a, 16b which are accommodated in recesses of mold plates 22a, 22b. The lower mold plate 22a is seated on a lower platen 19, and a heating plate 23 is provided above the upper mold plate 22b to bring and maintain the entire assembly at a suitable process temperature. The heating plate 23 is thermally insulated from the environment by means of an insulating plate 24. Above the insulating plate 24, a channel plate 25 is provided which is connected to an extruder and a heating device (not shown in each case) via which a suitably prepared plastic granulate is injected in a hot, plastically deformable state into the channels 26 and further into the hollow mold 18a.

In a cyclic process, an insulating sheath with a defined shape is produced from a shapeless granulate mass. The cycle begins with the injection mold in an opened state. The granules are drawn out of a hopper by means of a screw and heated and plasticized in a heated screw barrel. The plasticized plastic is then transported by the screw to a front part of the barrel, where it collects in front of an outlet nozzle. The plasticizing process is supplemented by a closing unit. This closing unit consists of two mold halves 22a, 22b, into which a single-part or multi-part injection mold 18a has been milled in accordance with the negative contour of the insulating sheath to be produced. A first mold half may be located on the side of the nozzle, a second mold half may be located on the ejection side.

To start the injection molding process, the two mold halves 22a, 22b are brought together, e.g. in a positive-fit manner, to form an injection mold. With the injection mold closed and with a defined melt volume, the plastic mass that has collected behind the nozzle is injected at high pressure via the axially displaceable screw at two or more injection points into the closed hollow mold 18a, wherein the closed hollow mold 18a may have one cavity or may have a plurality of cavities. The pressure thereby increases to a defined maximum value. To compensate for the shrinking mass of plastic melt as it solidifies, the pressure is maintained until any sink marks and blowholes have been avoided.

The injection mold is mounted on the clamping platen 19 which serves as the base plate. This may be provided with a centering element. By means of the centering element, the nozzle tip dips into the mold and presses it against the hollow mold. The specific advantage of the mold concept is based on tempering the mold inserts and contouring components while isolating them from the surrounding mold. As the inserts can be replaced, this allows short set-up times while maintaining high process reliability. Design and conception minimize the possibility of error sources.

Figure 6:
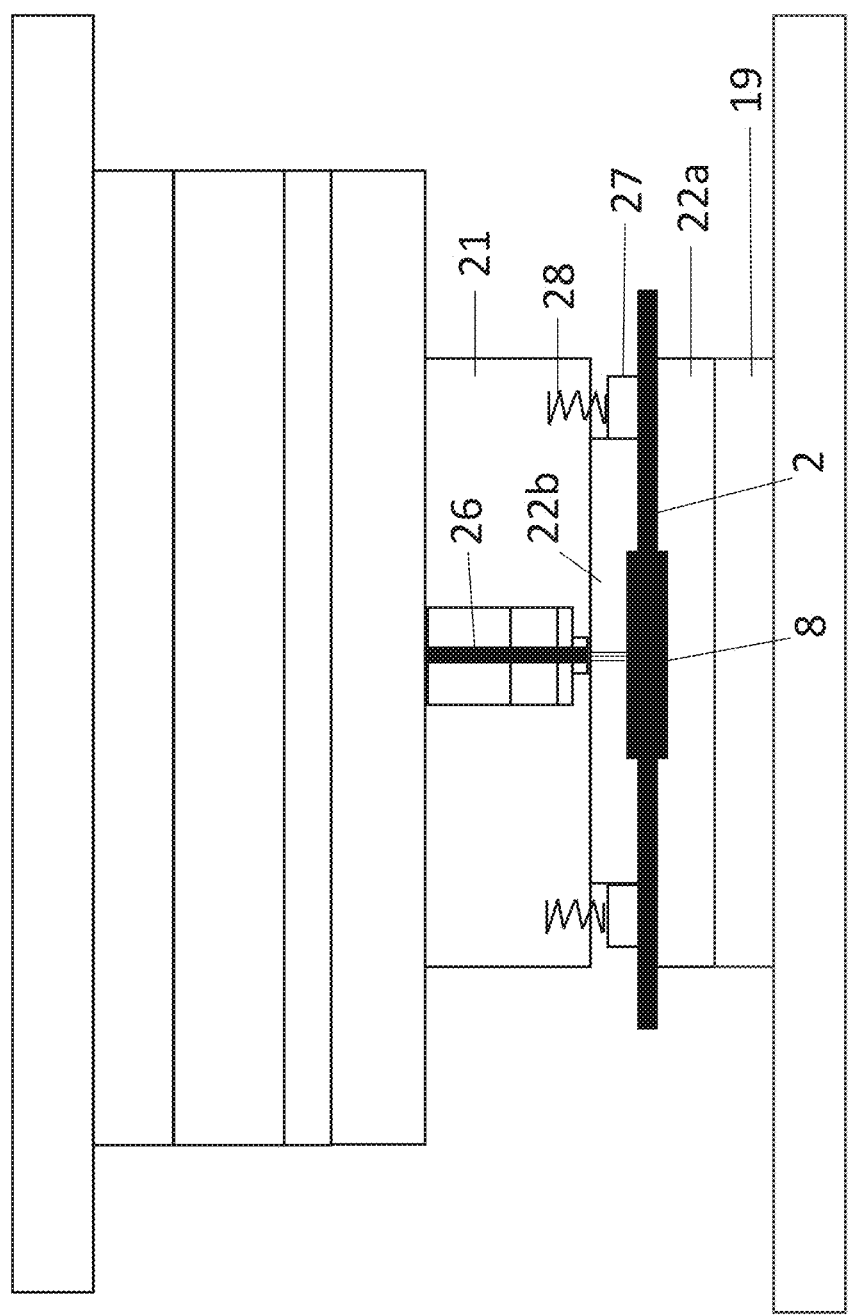
FIG. 6 is another schematic cross-sectional view of an injection mold for manufacturing a cable connection assembly according to the present invention.

FIG. 6 shows the injection mold of FIG. 5 in a side view rotated by 90 degrees.

Figure 7:
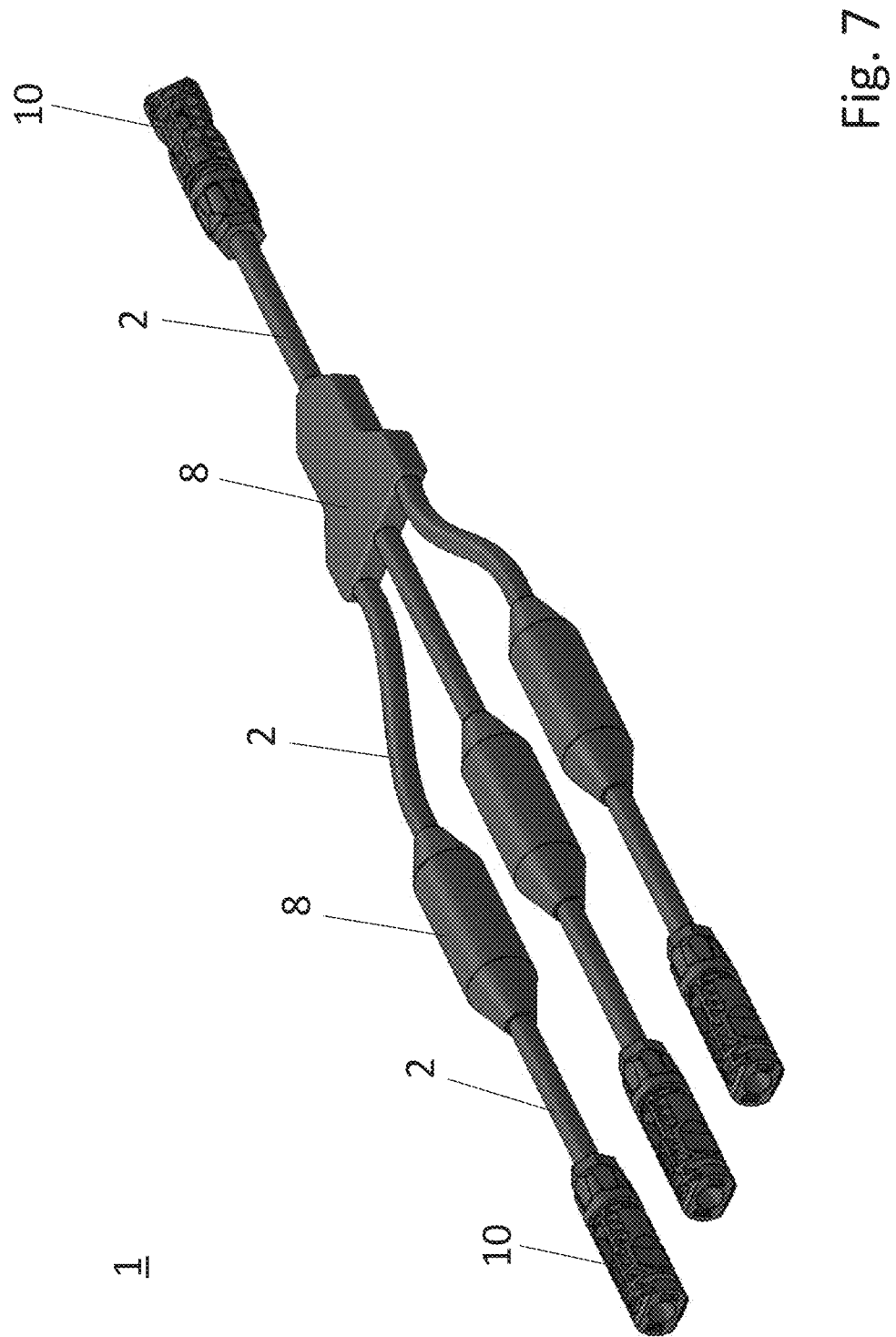
FIG. 7 is a perspective view of an example of a cable connection assembly according to the present invention.

FIG. 7 shows an example of a cable connection assembly 1 according to the present invention for connecting solar panels. On the input side, the cable 2 is provided with a connector 10. In the region of the insulating sheath 8, the cable 2 branches into three cables 2, which are connected to respective output-side connectors 10 via fuses or diodes, which are also encapsulated in insulating sheaths 8 of a plastic material.

To ensure that the encapsulating electric connection portion in the insulating encapsulation is uniformly and homogeneously encapsulated by plastic material, additional measures for centering and fixing the electric connection portion may be provided in the injection mold during the production of the insulating encapsulation, as described below by way of example with reference to FIG. 4b.

For this purpose, a symmetrical arrangement and shape of the channels through which the hot plastic compound is injected into the hollow mold for forming the insulating sheath is preferred, as is the feeding of identical quantities of the hot plastic compound with identical or synchronous timing. According to an embodiment of such a hollow mold, two feed channels each for the hot plastic mass may be arranged mirror-symmetrically on the left and right sides of the hollow mold, respectively, and these may each have identical dimensions, so that exactly identical quantities of hot plastic mass are passed through these feed channels into the cavity of the hollow mold. Each of the two feed channels may open into the hollow mold via a first (lower) channel and a second (upper) channel, each with identical dimensions. The two channels are preferably arranged in a mirror symmetric configuration with respect to a centerline of the hollow mold. The four mouth areas of these channels, through which identical quantities of hot plastic compound flow into the hollow mold in synchronous cycles, then automatically keep the electric connection portion centered in the hollow mold without the position of the electric connection portion changing during the injection molding process. In this way, a uniform wall thickness of the plastic material can be ensured in the insulating sheath to be produced.

Additional retaining or fixing elements (not shown) may be provided in the hollow mold or cavity to additionally fix the position of the electric connection portion during the injection molding process. These additional retaining or fixing elements may be cooled from the outside if necessary.

With reference to FIG. 8, an embodiment of an apparatus for forming surface-processed cable sheath end portions by means of laser light will be described hereinafter. This apparatus comprises two laser light sources 40a, 40b, which are disposed on two opposite sides of the individual cable to be processed and alternately emit light in a clocked manner onto the end portion of the individual cable to be processed. In particular, the two laser light sources 40a, 40b may be arranged in a mirrored arrangement with respect to the plane of the central axis of the individual cable to be processed without offset. Beam imaging devices 42a, 42b are associated with the laser light sources 40a, 40b to suitably image the two beams 41a, 41b onto the cables.

Preference is given to a surface treatment of the cable sheath that is as uniform as possible over the entire circumference of a cable. For this purpose, the beam bundles 41a, 41b may be suitably deflected to be guided along the circumference of a cable. In particular, cyclic beam deflection of the two beam bundles 41a, 41b using adjustable mirrors or galvanometer mirrors may be suitable for this purpose. The exposure to light can be used to suitably process a surface layer of the cable 2 (cf. FIG. 1). The exposure to light may cause a heating of the surface layer of the cable 2 to vaporize impurities in the surface layer portion, including vaporization of gas residues from the material of the cable sheath 4 near the surface layer. Heating may also cause the surface layer to melt for a short time, and subsequent cooling may result in a more homogeneous surface layer. Heating may also partially remove the surface layer, leaving behind a fresh surface layer of the insulating plastic material of the cable sheath that has not yet been exposed to atmospheric oxygen or other contaminants.

The beam bundles 41a, 41b can also be guided in a suitable manner over the surface layer of the cable sheath to form line patterns or hatch patterns, even several times in the same plane or in planes offset from each other, on the respective end portion of the individual cable 2 to be processed. These line patterns or hatch patterns may be formed by ablation of material of the cable sheath 4.

In this way, adjacent to the exposed conductor end portion 5 and over a length substantially matched to the length of the insulating sheath 8 to be subsequently formed (cf. FIG. 2a), a circumferential surface layer 6 is formed in which the material of the cable sheath 4 has been processed.

With reference to FIG. 9, another embodiment for an apparatus for forming surface-processed cable sheath end portions will be disclosed hereinafter, namely by mechanical machining, in particular by mechanical removal of cable sheath end portions close to the surface. Here, a mount 52 with rotational symmetry is coupled to a drive motor 50 via an output shaft 51, which may cause the mount 52 to rotate about an axis parallel to the longitudinal axis of the cable sheath. Blades or knives 53 are mounted on the inner side of mount 52, the spacing of which is dimensioned or adjusted during the rotary movement in such a way that cable sheath end portions near the surface of the cable sheath are removed, in particular abraded or milled off, near the end of the cable sheath 4 facing the electric conductor 3, in order to form surface-processed cable sheath end portions in a corresponding manner, with a fresh surface layer which has not yet been exposed to atmospheric oxygen or other impurities. Such devices are available, for example, as electrical stripping machines for enameled copper wires from Arno Fuchs Kabeltechnik GmbH, 73734 Esslingen (Germany).

Investigations by the inventors have shown that the surface-processed cable sheath end portion resulting from a suitable surface treatment as described above enables immediate and homogeneous crosslinking of the material of the cable sheath with plastic granules freshly supplied in the injection molding process. For such immediate and homogeneous cross-linking, the cable sheath and the plastic granules should consist of the same material.

The crosslinking creates irreversible chemical bonding bridges between the material of the cable sheath and the plastic granules freshly supplied in the injection molding process, so that the insulating sheath is very homogeneous and after curing of the plastic material there is no longer any difference between the material of the cable sheath and the plastic granules freshly supplied in the injection molding process. According to the present invention, no adhesion promoters are required to bond the material of the cable sheath to the plastic granules freshly supplied in the injection molding process. The homogeneous formation of the insulating sheaths means that corrosion problems and leaks at connection elements can be ruled out. Due to the direct material connection, particularly an improved moisture protection and a better mechanical resistance can be achieved. The injection molding process according to the present invention can be implemented cost-effectively and in a simple manner and enables a cable connection assembly with very compact, space-saving geometries.

In particular, ethylene-propylene copolymer can be used as the material for the cable sheath and the insulating sheaths, for example a blend 3G 711 black with the following composition:

| ingredient | |
|---|---|
| polyolefin (PO) | 100 |
| mineral filler | <200 |
| mineral oil components | <10 |
| antioxidants | <10 |
| crosslinking accelerator | <10 |
| activators | <10 |
| black soot | <10 |

Alternatively, other materials can be used as the material for the cable sheath and the insulating sheaths, for example ethyl vinyl acetate (EVA).

The immediate and complete cross-linking of the material of the cable sheath with plastic granules freshly supplied in the injection molding process can be easily demonstrated by characteristic properties of a cable connection assembly. In the case of a connection of the material of the cable sheath with plastic granules freshly supplied in the injection molding process using adhesion promotors (retaining agents) and other auxiliary materials according to a conventional process, residues of the plastic usually remain on the electric conductor when the electric conductor is pulled off. These adhere to the electric conductor as unsightly residues.

In contrast, in a cable connection assembly manufactured according to the present invention, virtually no residue of the plastic material remains on the electric conductor when the electric conductor is pulled off. Thus, no appreciable residues of plastic material remain attached to the electric conductor. In other words, in the region of the respective insulating sheath, the respective electric conductor can be exposed by pulling off the insulating sheath substantially without leaving any significant residue of the cable sheath or the plastic material adhering to the electric conductor.

For further experimental verification and to distinguish them from conventional cable connection assemblies, the insulation resistance to water was measured for a sample of five cable connection assemblies produced according to the present invention at a measuring voltage of 1,000 V.

To produce a cable connection assembly, four pieces of one-meter-long stranded wires were each stripped approx. 22 mm on one side and welded together to form an E-shaped distributing piece, which had three stranded wires on one side (input side) and a thicker stranded wire as output on the opposite second side (output side). The stripped area is joined together by welding and then treated by exposition to light. Before the actual test, the potting takes place as described above, which covers not only the weld completely but also the insulation of the four strands by a finger width (18 mm).

The cable connection assemblies manufactured according to the present invention were kept continuously in tap water at a temperature of 90° C. for 14 days (water boil test). The immersion depth was 20 cm. Insulation resistance was measured at a voltage of 1,000 V (meter: Fluke 1507) while the negative terminal was placed in the water and the positive terminal was clamped to one of the four strands of the E-connector. This allows the resistance of the stranded wire insulation and the potting body to be measured. The following values were measured (Table 1, columns with samples no. 1 to 5):

Connector (Manufactured According to the Present Invention)

TABLE 1 all resistance values specified in GΩ

| time | sample 1 | sample 2 | sample 3 | sample 4 | sample 5 | strand inserted after 60 min. |
|---|---|---|---|---|---|---|
| 5 min. | 9.60 | 8.00 | 8.30 | 6.50 | 6.50 | — |
| 15 min. | 3.70 | 3.20 | 3.70 | 3.20 | 3.10 | — |
| 30 min. | 2.10 | 1.90 | 2.10 | 1.83 | 1.90 | — |
| 45 min. | 1.97 | 1.52 | 1.82 | 1.70 | 1.74 | — |
| 1 hr | 1.93 | 1.51 | 180 | 1.20 | 1.63 | 4.20 |
| 1.5 hrs | 1.96 | 1.60 | 1.82 | 1.61 | 1.83 | 3.50 |
| 2 hrs | 1.62 | 1.40 | 1.70 | 1.43 | 1.60 | 2.80 |
| 4 hrs | 1.73 | 1.60 | 1.60 | 1.50 | 1.60 | 2.50 |
| 6 hrs | 1.62 | 1.60 | 1.70 | 1.41 | 1.52 | 2.40 |
| 8 hrs | 1.77 | 1.60 | 1.70 | 1.51 | 1.72 | 3.20 |

TABLE 1-continued all resistance values specified in GΩ

| time | sample 1 | sample 2 | sample 3 | sample 4 | sample 5 | strand inserted after 60 min. |
|---|---|---|---|---|---|---|
| 1 day | 1.40 | 1.24 | 1.50 | 1.33 | 1.50 | 2.60 |
| weekend | — | — | — | — | — | — |
| weekend | — | — | — | — | — | — |
| 4 days | 1.50 | 1.52 | 1.52 | 1.50 | 1.50 | 1.44 |
| 5 days | 2.20 | 2.00 | 2.02 | 2.03 | 1.94 | 2.30 |
| 6 days | 2.13 | 2.20 | 2.00 | 2.00 | 2.01 | 2.30 |
| 7 days | 2.50 | 0.60 | 2.30 | 2.30 | 2.30 | 2.30 |
| 8 days | 2.50 | 2.5 | 2.60 | 2.4 | 2.30 | 2.30 |
| weekend | — | — | — | — | — | — |
| weekend | — | — | — | — | — | — |
| 11 days | 5.10 | 1.50 | 4.20 | 4.10 | 4.10 | 3.70 |
| 12 days | 3.00 | 2.70 | 2.40 | 2.40 | 2.30 | 2.30 |
| 13 days | 3.00 | 2.50 | 2.40 | 2.30 | 2.30 | 2.2 |
| 14 days | 2.98 | 2.57 | 2.56 | 2.32 | 3.09 | 2.4 |

For comparison, a stranded wire with a length of 1 m without stripping was measured accordingly. The measured values are listed in the last column of Table 1.

Result: The measured values differ only insignificantly from stranded wires which were placed as a loop in the water bath without treatment. After the water had cooled down to 21° C., the insulation resistance of the cable connection assemblies and the untreated stranded wire strand rose again to the maximum value that could be measured (11 GΩ).

For further comparison, a strand with a length of 1 m without stripping was measured accordingly, but at a constant water temperature of 20-22° C.

Result: The insulation resistance was always the maximum value that could be measured (11 GΩ). A table of measured values is not given for this reason.

The above water boil test was repeated for a conventional cable connection assembly. The conventional cable connection assemblies are classically potted with hotmelt granules. Since this potting compound does not bond with the strand insulation, heat-shrinkable sleeves with internal adhesive are applied in advance. The adhesive ensures a tight seal between the strand insulation and the shrink tubing. The potting compound in turn forms a tight bond with the shrink tubing. The measured values were as shown in Table 2 below:

TABLE 2 all resistance values specified in MΩ

| time | conventional cable connection assembly |
|---|---|
| 5 min. | >11000 |
| 15 min. | 921 |
| 30 min. | 803 |
| 45 min. | 773 |
| 1 hr | 544 |
| 1.5 hrs | 351 |
| 2 hrs | 221 |
| 4 hrs | 131 |
| 6 hrs | 5.2 |
| 8 hrs | 4.9 |
| 1 day | 2.9 |
| weekend | — |
| weekend | — |
| 4 days | 1.3 |
| 5 days | 1.1 |
| 6 days | 1.2 |
| 7 days | 1.1 |
| 8 days | 1.0 |

TABLE 2-continued all resistance values specified in MΩ

| time | conventional cable connection assembly |
|---|---|
| weekend | — |
| weekend | — |
| 11 days | 1.2 |
| 12 days | 1.2 |
| 13 days | 1.1 |
| 14 days | 1.2 |

Result: the measured insulation resistance is significantly lower than that of a cable connection assembly manufactured according to the present invention. The insulation resistance of a cable connection assembly according to the present invention is significantly superior to the insulation resistance of a conventional cable connection assembly.

The "bonding agent" prevents the penetration of water. However, as adhesive ages and softens when exposed to heat, the seal can be lost over time.

Other halogen-free, crosslinked polymer mixtures are also particularly suitable as plastic materials, as are resistant, halogen-free, crosslinked special mixtures. Material mixtures that crosslink both the conductor sheath and the insulating sheath can provide >60 days more UV protection than required by DIN EN ISO 4892-2 table 3 para. 1, as well as significantly higher flame retardancy and twice the ozone resistance compared with VDE 0473-396 para. 8.1.3.

The cable sheath and insulating sheath consist of the identical polymer and bond irreversibly. The plastic granules for overmolding are liquefied. At high pressure >1500 bar, the compound is pressed into a hollow mold. The result is a precision piece that is absolutely diffusion-tight. Such a piece can be reproduced as often as required with same quality. Extensive tests and simulations led to the direct gating (direct molding) process according to the present invention. Pressure and heat generation can be coordinated so that crosslinking takes place during the dwell time in the injection mold.

In a process according to the present invention, the plastic granules can be injected into the hollow mold by means of a screw. In this case, the injection pressure can be measured near the gate and can be set between 600 and 700 bar, at a temperature between 180° C. and 225° C.

For the purposes of the present application, the term "cable" refers in particular to a single-core composite of electric conductors sheathed with insulating materials and used for the transmission of electric energy. The electric conductor can in particular be a stranded wire consisting of a plurality of thin individual wires, in particular of copper or aluminum.

LIST OF REFERENCE NUMERALS 1 cable connection assembly
2 cable
3 electric conductor
4 cable sheath
5 exposed conductor end portion
6 circumferential surface layer
7 electric connection region
8 insulating sheath
9 surface-processed cable sheath end portion
10 electrical connector
15 injection mold
16 insert plate of mold tool
16a bottom insert plate of mold tool
16b top insert plate of mold tool
17 lateral boundary plate
18 cavity
18a hollow mold
19 bottom clamping plate
20 feedthrough
21 upper platen
22a lower mold plate
22b upper mold plate
23 heating plate
24 insulating plate
25 channel plate
26 channel
26a first channel
26b second channel
26c feed channel
27 pushing member
28 spring
40a upper laser source
40b lower laser source
41a upper beam
41b lower beam
42a imaging device for upper beam
42b imaging device for lower beam
50 motor
51 output axis
52 mount
53 blade/Knife
L length of exposed conductor end portion 5
α angle of end region of insulating sheath 8

What is claimed is:

1. A method for manufacturing an electric cable connection assembly (1) for connecting solar panels, wherein the cable connection assembly (1) consists of at least two interconnected cables (2), comprising:
   providing at least two individual cables (2), each comprising an electric conductor (3) and a cable sheath (4) surrounding the electric conductor (3);
   removing the cable sheath (4) partially at an end portion of a respective individual cable (2) to form at least two exposed conductor end portions (5);
   connecting at least two exposed conductor end portions (5) to form a cable assembly having at least one electrically conductive connection (7); and
   forming at least one insulating sheath (8) by overmolding a respective electrically conductive connection (7) with a plastic material to form the electric cable connection assembly (1); wherein
   the step of removing the cable sheath (4) partially at the end portion of the respective individual cable (2) comprises partially removing a circumferential surface layer (6) of the respective cable sheath adjoining a respective exposed conductor end portion (5) to form respective surface-processed cable sheath end portions (9); and wherein
   the step of forming the at least one insulating sheath (8) for each of the exposed conductor end portions (5) comprises:
   placing the respective electrically conductive connection (7) of the cable assembly into a cavity (18) of an injection mold (15); and
   injecting a heated, plastically deformable plastic granule into the cavity (18) under pressure so that the material of the cable sheath in the respective surface-processed cable sheath end portions and the injected plastic granule are cross-linked with each other in the cavity (18); wherein the cable sheath and the plastic granules consist of the same material, and the plastic granules for overmolding are liquefied and pressed into the cavity (18) at a pressure in the range between 1000 bar and 1500 bar by means of an extruder.

2. The method as claimed in claim 1, wherein the step of removing the cable sheath (4) partially at an end portion of the respective individual cable (2) comprises partially removing a circumferential surface layer (6) of the respective cable sheath adjoining a respective exposed conductor end portion (5) by exposure to light to form respective surface-processed cable sheath end portions (9).

3. The method as claimed in claim 2, wherein laser light (41*a*, 41*b*) is imaged onto an end portion of an individual cable for exposure to light to ablate the material of the cable sheath at the end portion of the individual cable by laser ablation.

4. The method as claimed in claim 3, wherein two laser light sources (40*a*, 40*b*) are used for laser ablation, said two laser light sources (40*a*, 40*b*) being arranged on two opposite sides of the individual cable to be processed and alternately emit light in a clocked manner onto the end portion of the individual cable to be processed.

5. The method as claimed in claim 4, wherein the two laser light sources (40*a*, 40*b*) are arranged in a configuration mirrored with respect to the plane of the central axis of the individual cable to be processed without offset.

6. The method as claimed in claim 3, wherein the laser light is imaged onto the end portion of the individual cable by means of at least one beam imaging device (42*a*, 42*b*).

7. The method as claimed in claim 6, wherein the laser light (41*a*, 41*b*) for forming the respective surface-processed cable sheath end portion (9) is imaged as a line pattern or hatch pattern onto the respective end portion of the individual cable to be processed.

8. The method as claimed in claim 7, wherein the line pattern or hatch pattern is imaged onto the respective end portion of the individual cable to be processed several times in the same plane or in mutually offset planes.

9. The method as claimed in claim 6, wherein the laser light is imaged onto the end portion of an individual cable by means of adjustable mirrors or galvanometer mirrors.

10. The method as claimed in claim 1, wherein the pressure is maintained at least until the injected plastic granules begin to solidify in order to compensate for volume shrinkage of the insulating sheath (8).

11. The method as claimed in claim 10, wherein retaining or fixing elements are arranged in the respective cavity (18) of the injection mold (15) for fixing the cable assembly inside the respective cavity (18) of the injection mold (15).

12. The method as claimed in claim 11, wherein the retaining or fixing elements are cooled from outside the injection mold (15).

13. The method as claimed in claim 1, wherein the plastic granules are injected into the cavity (18) of the injection mold (15) symmetrically on two opposite sides of the respective electrically conductive connection (7) of the cable assembly to effect further centering of the respective electrically conductive connection (7) of the cable assembly in the cavity of the injection mold.

14. The method as claimed in claim 1, wherein a fuse is integrated into the electric cable connection assembly (1) in the region of at least one electrically conductive connection (7).

15. The method as claimed in claim 1, wherein end portions of the respective insulating sheaths (8) converge towards the associated cable sheath at an acute angle.

16. The method as claimed in claim 1, wherein an ethylene-propylene copolymer granule or an ethyl-vinyl acetate granule is used as the plastic granule.

\* \* \* \* \*